May 15, 1923.
J. SPAVENTOY
MANUAL SIGNAL FOR VEHICLES
Filed Sept. 10, 1921
1,455,231
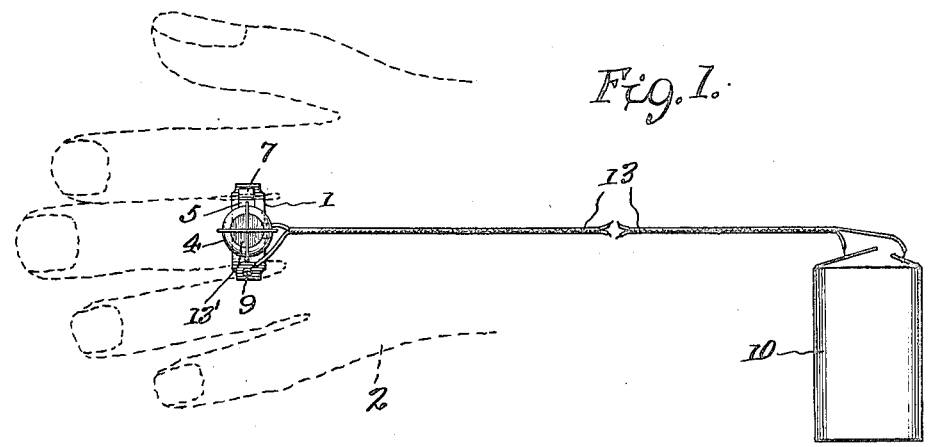
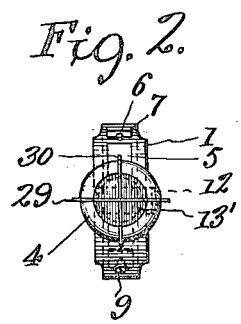
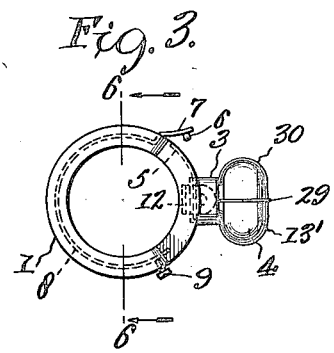
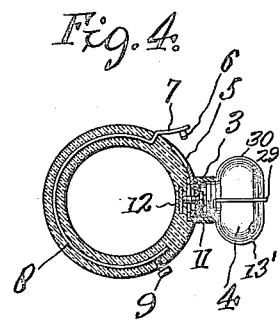
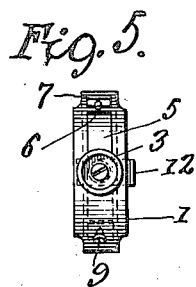
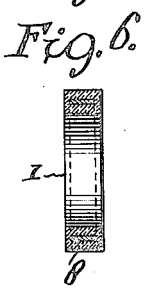
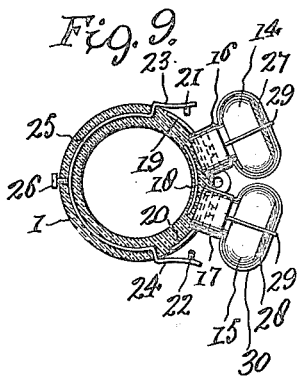
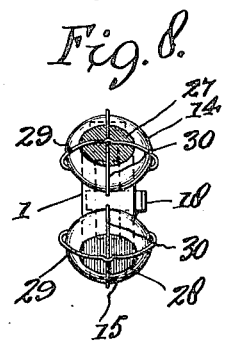
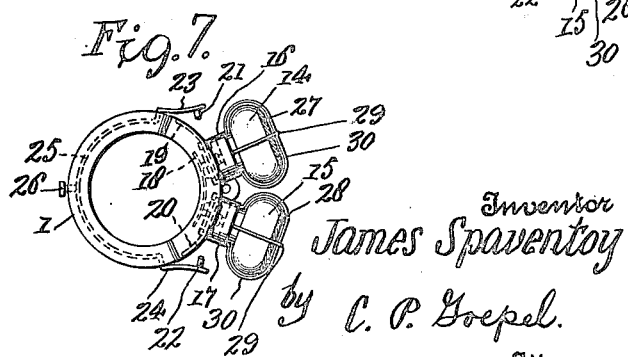
Inventor
James Spaventoy
by C. P. Goepel.
Attorney Patented May 15, 1923.

1,455,231

UNITED STATES PATENT OFFICE.

JAMES SPAVENTOY, OF BROOKLYN, NEW YORK.

MANUAL SIGNAL FOR VEHICLES.

Application filed September 10, 1921. Serial No. 499,759.

*To all whom it may concern:*

Be it known that I, JAMES SPAVENTOY, a citizen of the United States, and resident of the county of Kings, borough of Brooklyn, and State of New York, have invented certain new and useful Improvements in Manual Signals for Vehicles, of which the following is a specification.

The present invention relates to improvements in manual signals for vehicles in which provision is made for the illumination of the vehicle driver's hand under his control for the purpose of making clear to the drivers of on-coming vehicles the proposed changes in direction or stoppage of a preceding vehicle during night driving.

It is an object of the invention to provide a ring capable of being slipped upon the finger of the driver's hand which is to be thrust out beyond the side of the vehicle for the purpose of signalling vehicles in the rear, such ring being equipped with a lamp for illuminating the hand and showing clearly its position and the signal indicated thereby.

Another object of the invention is to produce a ring of this character carrying a lamp and a novel form of switch mechanism thereon designed to cooperate with the driver's fingers for the purpose of controlling the lighting of the lamp and the illumination of the hand.

A further object of the invention resides in providing a ring structure with an electric lamp and switch mechanism carried thereby conveniently in connection with a source of electric current for energizing the lamp, such lamp being differently colored as to its tip and base portions respectively to call attention of the driver of a vehicle in the rear to the signal and to further illuminate the hand so that the signal may be clearly seen.

With the foregoing and other objects in view, the invention will be more fully described hereinafter, and will be more particularly pointed out in the claims appended hereto.

In the drawings, wherein like symbols refer to like or corresponding parts throughout the several views, Fig. 1 is a plan view of a driver's hand with the signalling device in place thereon;

Fig. 2 is an edge view of the ring;

Fig. 3 is a side view thereof;

Fig. 4 is a central sectional view taken through the ring;

Fig. 5 is a view similar to Fig. 2 with the lamp bulb removed;

Fig. 6 is a sectional view taken on the line 6—6 in Fig. 3;

Fig. 7 is a side view of a slightly modified construction;

Fig. 8 is a top edge view of the same; and,

Fig. 9 is a central longitudinal sectional view therethrough.

Referring more particularly to the drawings, 1 designates a ring of a suitable size and shape to fit over the finger, represented at 2, of the driver of an automobile of other vehicle, which is designed to be thrust outwardly beyond the side of the vehicle to give a signal to indicate a proposed change of direction at a street intersection, or to announce the intention of the driver to make a stop. For purposes of winter driving the ring 1 is made of an appropriate diameter to slip over the glove worn by the hand 2.

The ring is preferably put upon the second finger in order that it may have a central location upon the hand and may throw its illumination in all radial directions to light up all parts of the hand and to show clearly just what the position of this member is and the signal to be conveyed thereby. Of course, the ring might be worn elsewhere if desired. Such ring is made conveniently of hard rubber or other insulating material and carried thereby is a socket 3 for the electric light bulb 4 which is removably threaded therein in accordance with a well known construction which admits of the bulb being replaced when burned out or broken. The exterior shell of the socket 3 is in electrical connection with a contact plate 5 extending to the outer surface of the ring for a suitable distance and positioned to cooperate with a pin 6 carried upon a spring contact finger 7 which lies beyond the perimeter of the ring and beyond the exterior of the insulation and in a position midway between a side portion of the ring, which engages directly between the fingers of the driver's hand and a part of the ring extending at right angles to such side portion, whereby the driver, by a relative movement of the finger adjacent that upon which the ring is carried, may cause a depressing movement of the spring finger 7 such as to bring the pin 6 against the contact plate 5 and close a circuit through the lamp bulb 4. This movement of the finger is preferably a movement at right angles to the plane of the palm of the hand and is executed by moving the finger backwardly, but it will be understood that the switch mechanism may be located to be closed by the forward movement of the finger if so desired.

The rear portion of the finger 7 is curved as indicated in Figs. 3 and 4 to conform to the curvature of the side of the finger which comes in contact therewith and to bring the outer free portion of the contact finger 7 directly in the path of the finger of the hand to insure the closing of the contact point 6 on the plate 5. The contact finger 7 is carried by a contact plate 8 lying embedded within the insulating material which constitutes the ring 1 and this contact plate 8 extends about for a desirable distance and is provided with a binding screw or post 9 to receive one of the wires or conductors extending from a battery or other source of current 10. The central terminal 11 of the lamp socket 3 is in connection with the other conductor by a plate 12 also embedded in the insulating material of the ring body. The conductors are wound together and enclosed in the usual casing which is indicated at 13. The battery 10 may be a small dry cell capable of being carried in the pocket of the driver or chauffeur, or the leads 13 may be directly connected to the storage battery of the vehicle. Sufficient wire will be provided to enable the driver to swing his arm outwardly without inconvenience or interference and in the use of a dry battery 10, the conductors may be made to lie along the arm of the hand carrying the ring and the battery 10 placed in the breast pocket which will be found to be a convenient arrangement.

The bulb 4 is of clear glass preferably at its base portion and about its sides, but is colored at its tip as represented at 13'. This color is advantageously red. The red tip 13' conveys the usual danger signal and it is generally found that this color distinguishes from the usual street illumination. It thus calls attention to the signal when displayed, while the portions of the bulb 4 thereunder cast a white light over the hand and serve to illuminate its outline clearly so that the particular signal being given may be clearly comprehended. Of course the tip portion 13' may be of any other desired color.

Referring more particularly to Figs. 7, 8 and 9, here the ring is provided with two bulbs 14 and 15 carried in separate sockets 16 and 17 disposed in multiple or parallel by means of a contact plate 18 secured to the ring 1 and having portions 19 and 20 extending at opposite sides of the two lamps for the purpose of closing contact with the pins 21 and 22 upon the two spring arms or fingers 23 and 24 which are carried upon the opposite free ends of a contact plate or ring 25 embedded in the insulating material and provided with a contact screw or post 26 to be connected to one of the leads of the battery.

In this instance, the bulb 14 may for instance be provided with a tip of green, colored glass 27 while the tip 28 of the companion bulb 15 is of red color. In this instance, the spring contact arms or fingers 23 and 24 are positioned for closing against portions 19 and 20 by opposite fingers to that carrying the ring and the driver may thus close either of the lamps 14 and 15 in accordance with a desired signal to be given. For instance, the lamp 15 might be closed to announce a proposed turn into an intersecting street to the left, while the opposite lamp 14 with the green tip might be illuminated to announce the intention to turn toward the right. Or the green tipped bulb 14 might be closed to indicate turns to the right or left while the red bulb 15 could be employed whenever a stop or a backing of the vehicle was to be made. The major portions of both bulbs 14 and 15 are of clear glass to cause an illumination of the hand.

Guard wires or rods 29 and 30 are preferably used to protect the bulbs. The wires or rods intersect at the tip portions of the bulbs and are of small cross section in order not to interfere with the illumination of the tips. The free ends of the guard rods or wires are carried into the lamp socket and are wedged therein by the lamp plug.

In the use of the device, the ring 1 is placed upon one of the fingers of the hand used for signaling purposes and is connected to a suitable cell or battery. Upon the projection of the hand for the purpose of representing to those in the rear or pedestrians or traffic officers what the driver's intention may be as to his course of direction, the finger adjacent the ring may be manipulated as described to cause a closing of the contacts and the consequent energizing of the lamp. The hand is thus illuminated to clearly convey the signal at night and at the same time to call attention by contrast to the tip of the bulb to the fact that a signal is at the instant being given. In the case represented in Figs. 7, 8 and 9, the portions of the contact fingers 23 and 24 which pass radially inward into the ring body provide stops for engaging opposite fingers on the hand of the driver to avoid any likelihood of the rings rotating which might otherwise allow the ring to slip around and involving failure to close the contact.

The guard arms or rods 29 and 30 are preferably spaced outwardly a slight distance from the bulb to more adequately protect it from being struck upon the side of the car or other surrounding objects.

It will be appreciated from the foregoing that the ring provides a convenient and compact carrier for an electric lamp and switch mechanism which enables the device to be held securely upon the hand in a central location to cause a complete illumination of the back of the hand during night signalling and that the device may be operated at very small expense and current consumption, and will be exceedingly effective as a simple and economical device for carrying on methods of signalling which, while found to be exceedingly practical for daylight driving, become of substantially no use after dark.

It is obvious that various changes and modifications may be made in the details of construction and design of the above specifically described embodiment of this invention without departing from the spirit thereof, such changes and modifications being restricted only by the scope of the following claims:

What is claimed is:

1. A signalling device for use on vehicles comprising a ring of insulating material adapted to fit over one of the fingers of the driver's hand and to slip down to the base of the fingers adjacent the palm of the hand, a contact strip embedded in said ring and having a spring contact finger extending to the exterior of the ring and outwardly beyond the back of the hand, said contact finger extending substantially at a tangent to the ring and having its outer free end projecting in the path of an adjacent finger of the operator's hand moving in the direction at right angles to the plane of the palm whereby to press the free end of the contact finger toward the ring, a contact plate carried by the ring in position to be engaged by said contact finger, a lamp bulb carried by the rear portion of said ring in circuit with said contact, said lamp bulb adapted to illuminate the back of the hand and the fingers, and a battery carried at a remote point from the hand and having leads connected to said contact strip and the lamp.

2. A signalling device for vehicles comprising a ring of insulating material adapted to fit the finger of the driver's hand and to lie at the base of the finger adjacent the palm, a lamp bulb carried by said ring and having a colored tip portion and an uncolored major portion adapted to illuminate the back of the hand and the fingers a contact carried by said lamp, a second contact strip embedded in said ring and having an end thereof projecting outwardly from the ring adjacent said lamp and said contact, said finger being curved and disposed in the path of the adjacent finger of the driver's hand when moved backwardly at substantially right angles to the plane of the palm whereby to cause the finger to press against the contact, and a source of current carried at a remote point from the hand and having leads connected with said contact strip and with the lamp.

3. A signalling device for vehicles comprising a ring of insulation material, a pair of lamps carried thereby and in connection in common with a source of current, contact plate for each lamp, and a contact strip embedded in the ring and having contact fingers projecting therefrom and adapted to be individually closable against the contact plates of the respective lamps.

4. A signalling device for vehicles comprising a ring of insulation material adapted to fit upon one of the fingers of the driver's hand a pair of lamps carried by the ring and adapted to illuminate the back of the hand and the fingers, said lamps being included in parallel, contact plates for the lamps carried by said ring, and a contact strip also carried by said ring having spring fingers projecting beyond the ring in position to close against said contact plates, said fingers being arranged in the path of adjacent fingers of the operator's hand and adapted to be encountered by movement of such operator's fingers in a direction substantially at right angles to the plane of the palm of the hand.

5. A signalling device comprising a ring adapted to be fitted upon a finger of a vehicle driver's signalling hand, a plurality of electric lamps carried thereby having differently colored tip portions and base portions for illuminating the hand, a source of current, and separately closable contacts at opposite lateral portions of the ring for closing circuit through the lamps individually by movement of opposite fingers of the driver's hand.

In testimony that I claim the foregoing as my invention, I have signed my name hereunder.

JAMES SPAVENTOY.